US008004773B2

United States Patent
Hosoda et al.

(10) Patent No.: US 8,004,773 B2
(45) Date of Patent: Aug. 23, 2011

(54) LENS DRIVE MECHANISM AND OPTICAL PICKUP HAVING SAME

(75) Inventors: Ryozo Hosoda, Osaka (JP); Tetsuya Yoshida, Osaka (JP); Shinya Hatano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 184 days.

(21) Appl. No.: 12/463,670

(22) Filed: May 11, 2009

(65) Prior Publication Data

US 2009/0284852 A1    Nov. 19, 2009

(30) Foreign Application Priority Data

May 19, 2008   (JP) ................................. 2008-130291

(51) Int. Cl.
 *G02B 15/14* (2006.01)
(52) U.S. Cl. ...................................................... 359/696
(58) Field of Classification Search .................. 359/696, 359/822–824, 829; 369/44.16
See application file for complete search history.

(56) References Cited

U.S. PATENT DOCUMENTS

| 6,335,915 | B1 | 1/2002 | Uchiyama et al. ............. 369/223 |
| 6,724,714 | B1 * | 4/2004 | Kato et al. ...................... 720/672 |
| 2001/0022771 | A1 | 9/2001 | Muto et al. ..................... 369/219 |

FOREIGN PATENT DOCUMENTS

| JP | 60-191479 | 9/1985 |
| JP | 63-9078 | 1/1988 |
| JP | 2-149169 | 12/1990 |
| JP | 2003-059212 | 2/2003 |
| JP | 2007265597 A | 10/2007 |
| JP | 2007-287281 | 11/2007 |
| JP | 2008-041214 | 2/2008 |
| JP | 11259906 A | 9/2009 |
| WO | WO 2008/044674 | * 4/2008 |

* cited by examiner

*Primary Examiner* — Joseph P Martinez
(74) *Attorney, Agent, or Firm* — Morgan, Lewis & Bockius LLP (57) ABSTRACT

A lens drive mechanism includes a drive source; a lead screw that is connected to the drive source and rotated by operation of the drive source; a nut member that screws on the lead screw and moves as the lead screw rotates; a lens hold portion that is so disposed as to move as the nut member moves and hold a lens; a guide member that guides the lens hold portion to move in the same direction as that of movement of the nut member; and a leaf spring member that if the nut member is situated near one end of a thread portion of the lead screw, pressurizes the nut member toward the other end of the thread portion of the lead screw.

11 Claims, 5 Drawing Sheets

LENS DRIVE MECHANISM AND OPTICAL PICKUP HAVING SAME

This application is based on Japanese Patent Application No. 2008-130291 filed on May 19, 2008, the contents of which are hereby incorporated by reference.

BACKGROUND OF THE INVENTION

1. Field of the Invention

The present invention relates to a lens drive mechanism that is mounted in an optical apparatus in which an optical system is built, and also relates to an optical pickup that includes a lens drive mechanism.

2. Description of Related Art

Conventionally, some optical apparatuses in which an optical system is built include a lens drive mechanism that drives a lens. For example, in an optical pickup that is used to read information recorded on an optical disc or write information on an optical disc, a lens drive mechanism is sometimes included to correct spherical aberration.

Specifically, there is an optical pickup that moves a collimate lens disposed in an optical system in the optical-axis direction by using a lens drive mechanism, and performs correction of spherical aberration by changing convergent and divergent states of incident light (e.g., see JP-A-1999-259906). Besides, as another example, there is an optical pickup that uses a movable lens different from a collimate lens to correct spherical aberration, in which case a lens drive mechanism is also used (e.g., see JP-A-2007-265597).

Conventionally, various structures of a lens drive mechanism disposed in an optical pickup have been proposed. For example, JP-A-1999-259906 discloses a structure in which rotation of a DC motor serving as a drive source for moving a holder which holds a collimate lens is changed by a gear mechanism into linear motion along the optical-axis direction, so that the lens and the holder are moved together. However, because the structure of the gear mechanism disclosed in JP-A-1999-259906 is complicated, a lens drive mechanism having a simple structure is desired.

Figure 9A:
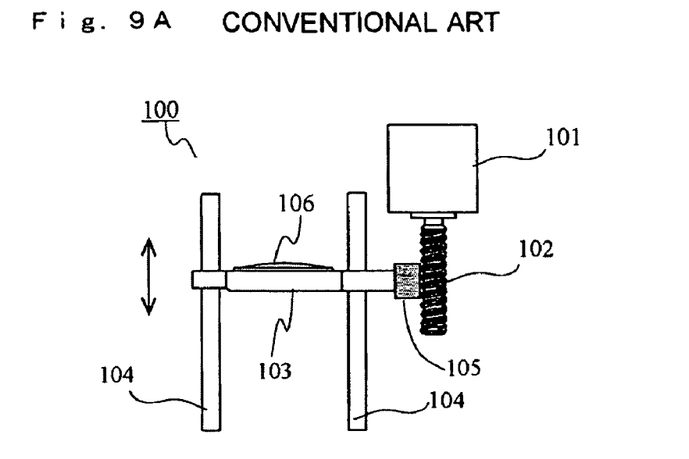
FIG. 9A is a view to explain a structure of a lens drive mechanism of conventional lens drive mechanisms that uses a teeth member to drive a lens, that is, a schematic plan view showing a structure of the lens drive mechanism.
Figure 9B:
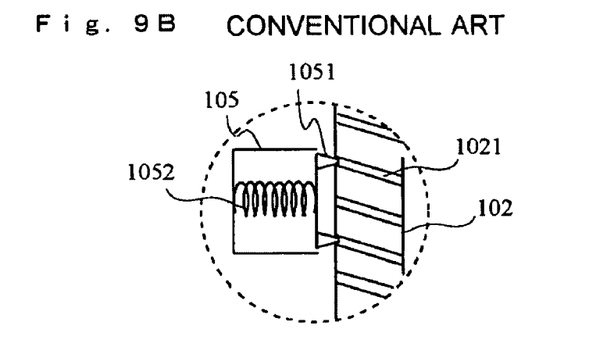
FIG. 9B is a view to explain a structure of a lens drive mechanism of conventional lens drive mechanisms that uses a teeth member to drive a lens, that is, a schematic view to explain function of the teeth member.
Figure 10:
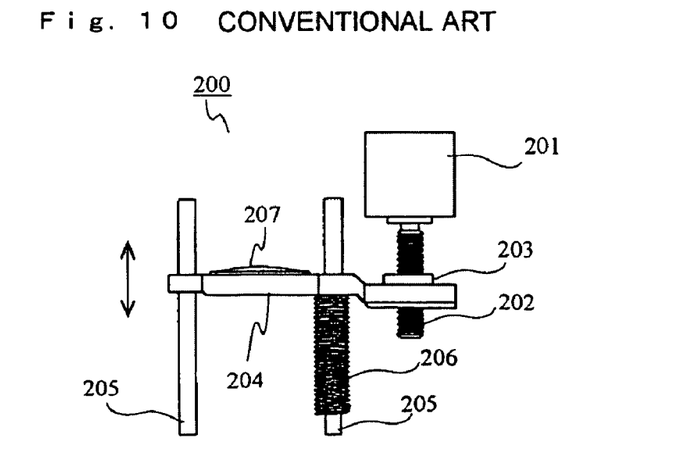
FIG. 10 is a schematic plan view showing a structure of a lens drive mechanism of conventional lens drive mechanisms that uses a nut member to drive a lens.

For this reason, conventionally, for example, as shown in FIGS. 9A, 9B and 10, lens drive mechanisms having a simple structure have been proposed. FIGS. 9A and 9B are views to explain a structure of a lens drive mechanism of conventional lens drive mechanisms that uses a teeth member to drive a lens. FIG. 9A is a schematic plan view showing a structure of the lens drive mechanism that uses a teeth member to drive a lens, and FIG. 9B is a schematic view to explain function of the teeth member. FIG. 10 is a schematic plan view showing a structure of a lens drive mechanism of conventional lens drive mechanisms that uses a nut member to drive a lens.

A conventional lens drive mechanism 100 shown in FIGS. 9A and 9B comprises a motor 101 that serves as a drive source, a lead screw 102 that is connected to an output shaft of the motor 101 and is rotated by operation of the motor 101, a lens holder 103 that holds a lens 106, two guide shafts 104 that guide movement of the lens holder 103, and a teeth member that is fixed on the lens holder 103, is so disposed as to engage with the lead screw 102, and is moved as the lead screw 102 rotates.

As shown in FIG. 9B, the teeth member is provided with a plurality of gear teeth 1051. The gear teeth 1051 are so disposed as to mesh with a spiral groove 1021 formed on the lead screw 102. The teeth member 105 is equipped with a pressurizing spring 1052 that pressurizes the gear teeth 1051 to the groove 1021 of the lead screw 102. Accordingly, when the lead screw 102 is rotated by operation of the motor 101, the lens holder 103 moves along the guide shafts 104 together with the teeth member 105. Hereinafter, the type of the lens drive mechanism 100 that drives the lens 106 in this way is referred to as a teeth type.

A conventional lens drive mechanism 200 shown in FIG. 10 comprises a motor 201 that serves as a drive source, a lead screw 202 that is connected to an output shaft of the motor 201 and is rotated by operation of the motor 201, a lead nut 203 that movably screws on the lead screw 202 and is moved by rotation of the lead screw 202 in directions indicated by an arrow shown in FIG. 10, a lens holder 204 that holds a lens 207, two guide shafts 205 that guide movement of the lens holder 204, and a coil-shape pressurizing spring 206 that is loosely mounted on one of the two guide shafts 205. The pressurizing spring 206 pressurizes the lens holder 204 toward the motor 201.

Accordingly, if the lead screw 202 is rotated by operation of the motor 201 and the lead nut 203 moves in a direction to be away from the motor 201, the lens holder 204 is pushed by the lead nut 203 and is moved in a direction to be away from the motor 201. On the other hand, if the lead nut 203 moves in a direction toward the motor 201, the lens holder 204 moves in a direction toward the motor 201 with the aid of pressurizing force of the pressurizing spring 206. Hereinafter, the type of the lens drive mechanism that drives the lens 207 in this way is referred to as a lead nut type.

However, in the conventional lens drive mechanism 100 of the teeth type, it is hard to adjust the pressurizing force given by the pressurizing spring 1052, and if the adjustment of the pressuring force is not optimum, a tooth skip due to vibration impact easily occurs. Especially, for example, because a lens drive mechanism that is disposed in an optical pickup as a mechanism to correct spherical aberration is required to be small, there is a problem that it is hard to optimize the pressurizing force of the pressurizing spring 1052.

In this point, in the conventional lens drive mechanism 200 of the lead nut type, a tooth skip due to vibration impact does not occur, and positioning accuracy in the time of usual operation is stable. Besides, it is excellent in mass production of components and is easy to fabricate even if size reduction is required. Because of these advantages, considering a possibility that a lens drive mechanism of the lead nut type is used, the inventors have further studied a lens dive mechanism of the lead nut type and found out that there are problems as follows.

There is a case where circuit trouble causes an electric current to keep flowing through the motor, and an unusual operation that the lens holder tries to keep advancing in a direction occurs. In such an unusual operation, in the lead nut type, a trouble sometimes occur, in which a thread of the lead nut goes onto a thread of the lead screw, so that mechanical lock occurs. If mechanical lock occurs, drive force of the motor cannot put the lead nut back into the usual state even if the unusual operation is resolved and it is tried to move the lead nut in a backward direction.

In a case where the lead nut type is employed, a method can be thought of, in which notches are formed in the lead nut to reduce threads, so that it becomes hard for mechanical lock to occur. However, because such a method requires the shape of the lead nut to be devised, there is a problem that it becomes hard to maintain component dimensions and the like.

SUMMARY OF THE INVENTION

In light of the above problems, it is an object of the present invention to provide a lens drive mechanism that is not easily influenced by vibration impact and is able to protect mechanical lock from occurring in the time of unusual operation with a simple structure. It is another object of the present invention to provide an optical pickup that includes such a lens drive mechanism and is able to stably correct spherical aberration.

To achieve the above object, a lens drive mechanism according to the present invention comprises: a drive source; a lead screw that is connected to the drive source and rotated by operation of the drive source; a nut member that screws on the lead screw and moves as the lead screw rotates; a lens hold portion that is so disposed as to move as the nut member moves and hold a lens; a guide member that guides the lens hold portion to move in the same direction as that of movement of the nut member; and a leaf spring member that if the nut member is situated near one end of a thread portion of the lead screw, pressurizes the nut member toward the other end of the thread portion of the lead screw.

According to this structure, it is possible to make the nut member stay at a predetermined position with the aid of pressurizing force of the leaf spring member even if unusual operation occurs. Accordingly, it is possible to prevent the nut member from continuing to advance in a direction because of the unusual operation and colliding with, for example, the drive source, a wall and the like, thereby preventing occurrence of mechanical lock between the lead screw and the nut member. Besides, because of the structure in which mechanical lock is prevented by the leaf spring member, the structure of the lens drive mechanism does not become complicated. After the unusual operation is resolved, it is possible to put the nut member back into the usual state in which the nut member is able to operate normally with the aid of pressurizing force of the leaf spring member, and the adjustment to put the nut member back into the usual state is easily performed. In addition, because of the structure in which the lens holder is carried by the nut member, the lens drive mechanism is not easily influenced by vibration impact.

As a specific structure of the lens drive mechanism, a structure may be employed, in which an energizing member that energizes the lens hold portion toward the drive source is further included, the nut member is disposed closer to the drive source than the lens hold portion is, and the leaf spring member pressurizes the nut member situated near the one end of the thread portion of the lead screw which is close to the drive source.

As a further specific structure of the lens drive mechanism, a structure may be employed, in which the drive source is provided with a first fixing portion that is used to fix the drive source on a base member, the spring member is provided with a second fixing portion that is used to fix the spring member on the base member, and the first fixing member and the second fixing member are fixed on the base member at the same position. This structure is a structure in which the leaf spring member whose positional relation with the drive source is important is fixed at the same position as that of the drive source, and it is possible to prevent positional deviation between the drive source and the leaf spring member in the time of disposing them.

In the lens drive mechanism having the above structure, the leaf spring member may have a first portion that serves as a top plate, and a second portion that is bent with respect to the first portion and has a portion which comes into contact with the nut member. And as a further specific structure, a structure may be employed, in which the first portion is provided with an opening portion and two arm portions that are formed with the opening portion interposed therebetween, and the two arm portions are linked to the second portion that is formed into an inversed M shape. According to this structure, it is advantageous that elastic force of the leaf spring member is able to be adjusted by adjusting the area of the opening portion of the top plate. According to this structure, it is easy to achieve a structure in which the leaf spring member and the nut member do not come into contact with each other, and the contact area between the leaf spring member and the nut member becomes large. Besides, according to this structure, it is possible with stainless steel (SUS) to obtain elastic force that is comparable to that of special spring steel such as phosphor bronze and the like.

In addition, to achieve the above object, an optical pickup according to the present invention comprises a lens drive mechanism having the above structure.

According to this structure, the optical pickup includes a lens drive mechanism that is not easily influenced by vibration impact, and is able to prevent mechanical lock from occurring in the time of unusual operation. Accordingly, the optical pickup includes a high-quality lens drive mechanism, and the reliability of the optical pickup is upgraded.

The optical pickup having the above structure according to the present invention may have a structure, in which the lens is a collimate lens, and the collimate lens is moved by the lens drive mechanism along the optical-axis direction. Accordingly, the lens drive mechanism is able to serve as a spherical-aberration correction mechanism. And, according to this structure, it becomes possible to stably correct spherical aberration.

According to the present invention, it is possible to provide a lens drive mechanism that is not easily influenced by vibration impact and is able to prevent mechanical lock from occurring in the time of unusual operation with a simple structure. Besides, according to the present invention, it is possible to provide an optical pickup that includes such a lens drive mechanism and is able to stably correct spherical aberration.

DETAILED DESCRIPTION OF THE PREFERRED EMBODIMENTS

Hereinafter, embodiments of a lens drive mechanism and an optical pickup having the lens drive mechanism according to the present invention are explained with reference to drawings.

Figure 1:
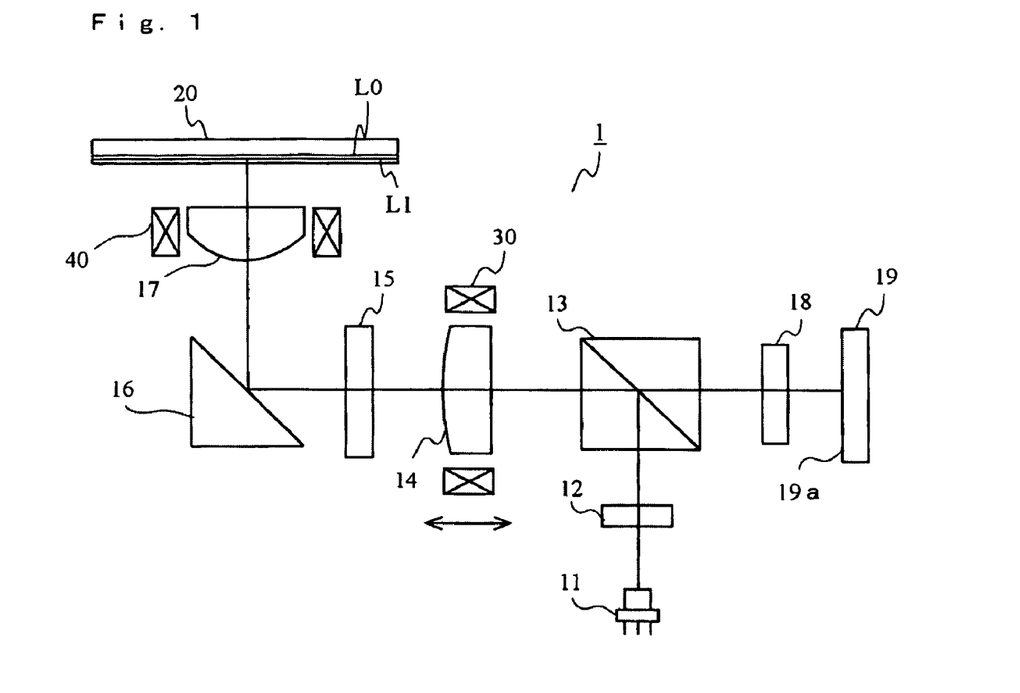
FIG. 1 is a schematic view showing a structure of an optical pickup according to an embodiment.

Optical-Pickup Structure: First, a structure of an optical pickup having a lens drive mechanism according to the embodiment is explained with reference to FIG. 1. FIG. 1 is a schematic view showing a structure of an optical pickup according to the embodiment. An optical pickup 1 according to the embodiment is an example of an optical pickup that is used to read information recorded on a Blu-ray disc (BD) or write information to a BD.

An optical pickup 1 is equipped with an optical system that includes a semiconductor laser 11, a diffraction element 12, a polarization beam splitter 13, a collimate lens 14, a ¼ (quarter) wave plate 15, a raising mirror 16, an objective lens (objective) 17, a cylindrical lens 18, and a photo detector 19.

The semiconductor laser 11 is disposed to direct light to a laser disc 20 when reading information recorded on the laser disc 20 and when recording information onto the laser disc 20. The wavelength of laser light emitted from the semiconductor laser 11 is suitably selected depending on the kind of an optical disc that is used by the optical pickup 1 for reading and writing of information. In the embodiment, because the optical disc 20 used by the optical pickup 1 is a BD, laser light having a wavelength of 405 nm is emitted from the semiconductor laser 11.

The diffraction element 12 is disposed to diffract laser light emitted form the semiconductor laser 11 and to divide it into a main light ray and two sub-light rays. The diffraction element 12 is formed of, for example, a resin or a transparent member such as glass and the like, and diffraction gratings are formed on the surface thereof. The reason to divide laser light into three light rays by using the diffraction element 12 is that it becomes possible to generate signals used for servo (focusing control and tracking control) by using signals outputted from the photo detector 19.

The polarization beam splitter 13 has a function to reflect laser light emitted from the semiconductor laser 11 and to transmit the laser light therethrough that is reflected by the optical disc 20 and then sent to the polarization beam splitter 13. Both laser light that is emitted from the semiconductor laser 11 and enters the polarization beam splitter 13 and laser light that is reflected by the optical disc 20, then enters the polarization beam splitter 13 are linearly polarized light, with the polarization directions different to each other by 90°. The difference between the polarization directions is due to a function of the ¼ wave plate described later.

The collimate lens 14 is a lens that has a function to transform incident laser light into parallel light. In the embodiment, the collimate lens 14 is moved in the optical-axis direction (the direction indicated by an arrow in FIG. 1) by a lens drive mechanism 30 that is described in detail later. Accordingly, laser light that is transmitted from the polarization beam splitter 13 and passes through the collimate lens 14 is not invariably parallel light and is transmitted as convergent light or divergent light. The reason to move the position of the collimate lens 14 by using the lens drive mechanism 30 is that it becomes possible to correct spherical aberration.

A BD used by the optical pickup 1 according to the embodiment generally has two recoding layers (which respectively correspond to an L0 layer and an L1 layer in FIG. 1) following the standards for BDs. In this case, there is a problem that spherical aberration occurs because the recording layers L0 and L1 are different from each other in that their protection layers formed of a transparent resin are different from each other in thickness. For this reason, in the optical pickup 1, a structure is employed, in which the collimate lens 14 is so disposed as to be movable in the optical-axis direction by the lens drive mechanism 30, convergent and divergent states of laser light entering the objective 17 are changed by adjusting the position of the collimate lens 14, thereby correcting spherical aberration.

The ¼ wave plate 15 transforms laser light having passed through the collimate lens 14 into circularly polarized light. Laser light (circularly polarized light) which is reflected by the optical disc 20, then enters the ¼ wave plate 15 is transmitted as linearly polarized light. The polarization direction of the linearly polarized light transmitted has a polarization direction that is rotated by 90° to the polarization direction of the linearly polarized light emitted from the semiconductor laser 11.

The raising mirror 16 reflects laser light from the ¼ wave plate 15 to obtain light whose optical axis is perpendicular to the disc surface of the optical disc 20.

The objective 17 condenses incident laser light on the L0 layer or the L1 layer (both are recoding layers) of the optical disc 20. The objective 17 is incorporated in an actuator 40 and is movable in a focus direction (an up-down direction in FIG. 1) and a track direction (a direction perpendicular to the paper surface of FIG. 1). Accordingly, focusing control and tracking control of the optical pickup 1 becomes possible. Changing the focus position of the objective 17 from the L0 layer to the L1 layer, or from the L1 layer to the L0 layer, that is, focusing jump is implemented by operation of the actuator 40. Because structure of the actuator 40 that drives the objective 17 is known, explanation of the structure is skipped here.

Laser light that is emitted from the semiconductor laser 11 and reflected by the optical disc 20 passes through the objective 17. Then the light is reflected by the raising mirror 16, and passes through successively the ¼ wave plate 15, the collimate lens 14, and the polarization beam splitter 13. Then, the light undergoes astigmatism by the cylindrical lens 18 and is received by the photo detector 19.

The photo detector 19 transduces incident light information into an electrical signal and outputs it to an RF amplifier (not shown) and the like. The electrical signal outputted from the photo detector 19 is processed into a reproduction signal, a focus error (FE) signal, a tracking error (TE) signal or another signal. The FE signal and the TE signal are used to perform the above focusing control and tracking control, respectively.

Structure Of Lens Drive Mechanism: The structure of the optical pickup according to the present invention is explained above. Next, a structure of the lens drive mechanism 30 that drives the collimate lens 14 is explained referring to chiefly FIGS. 2 to 7.

Figure 2:
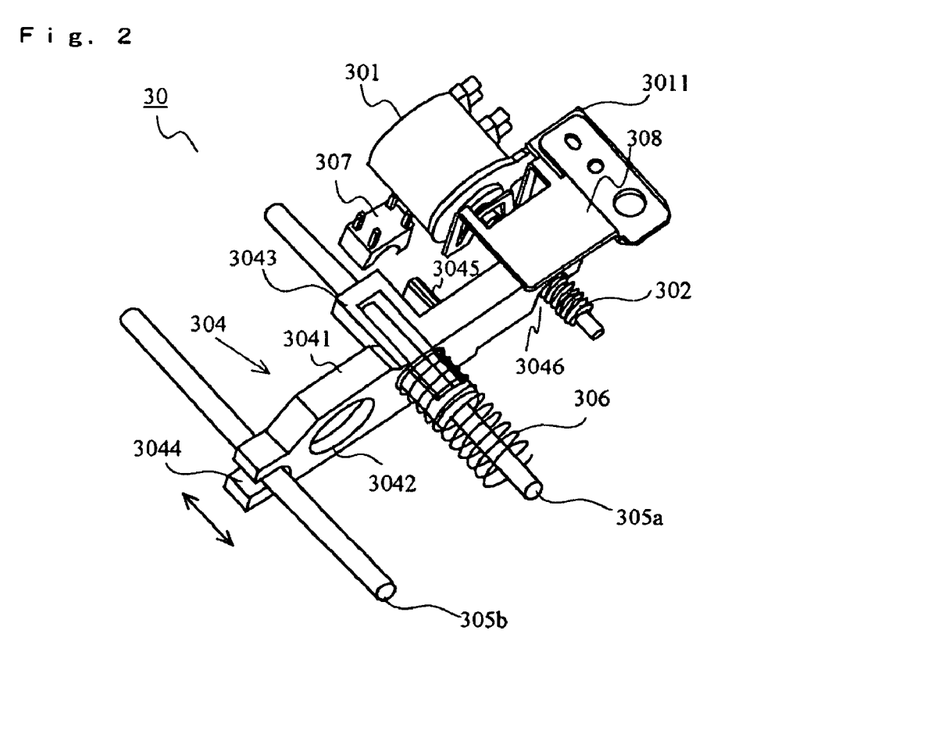
FIG. 2 is a schematic perspective view showing a structure of a lens drive mechanism according to the embodiment.
Figure 3A:
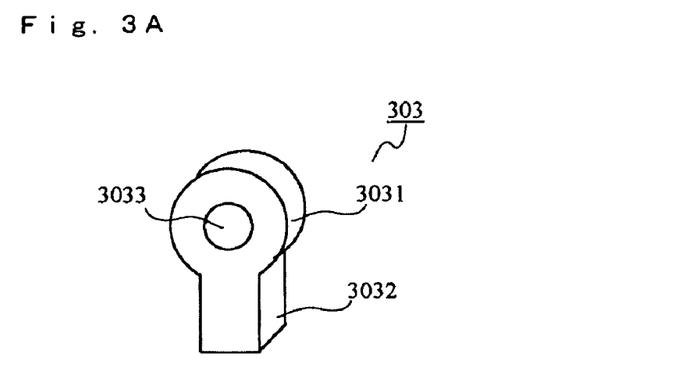
FIG. 3A is a schematic perspective view showing a lead nut of a lens drive mechanism according to the embodiment.
Figure 3B:
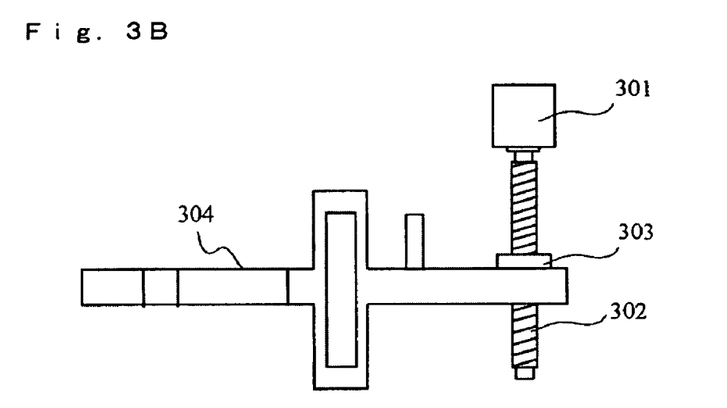
FIG. 3B is a view showing relation between a lead nut and a lens holder of a lens drive mechanism according to the embodiment.
Figure 4:
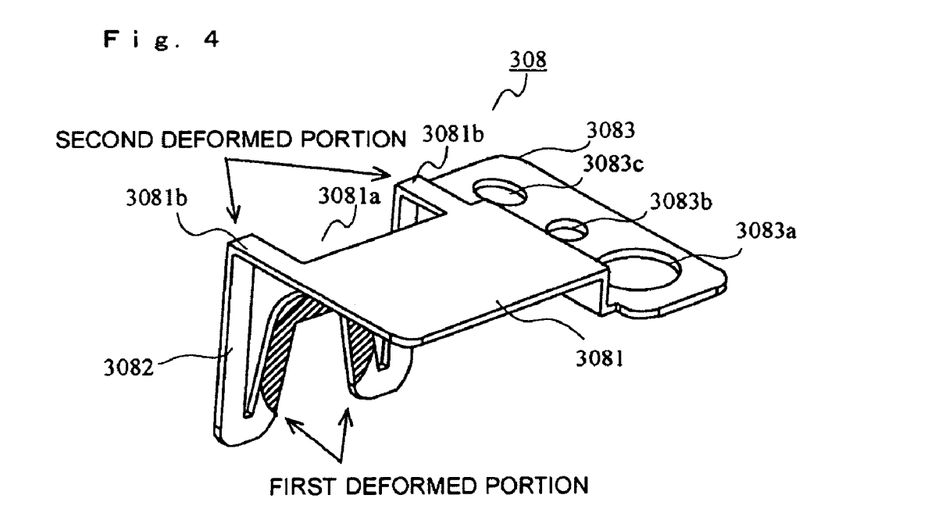
FIG. 4 is a schematic perspective view showing a structure of a leaf spring member of a lens drive mechanism according to the embodiment.
Figure 5:
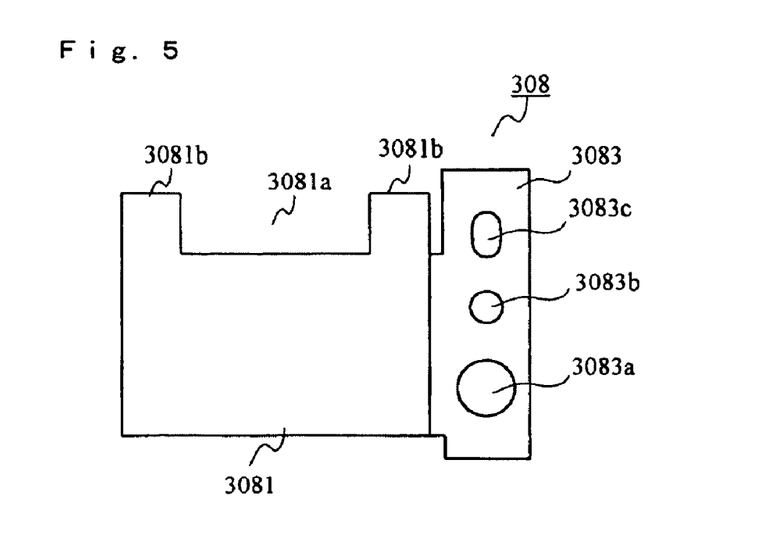
FIG. 5 is a schematic plan view showing a structure of a leaf spring member of a lens drive mechanism according to the embodiment.
Figure 6:
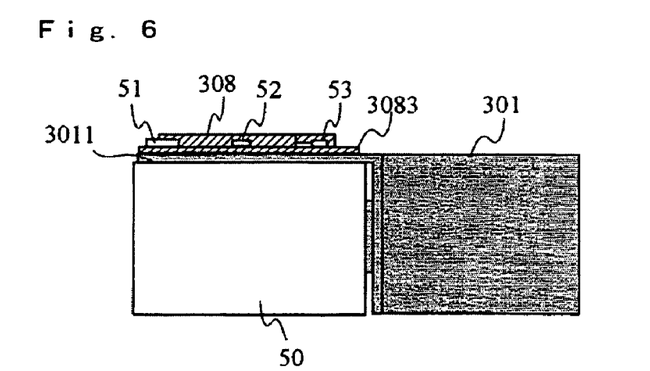
FIG. 6 is a view to explain fixed positions of a stepping motor and a leaf spring member in a lens drive mechanism according to the embodiment.
Figure 7:
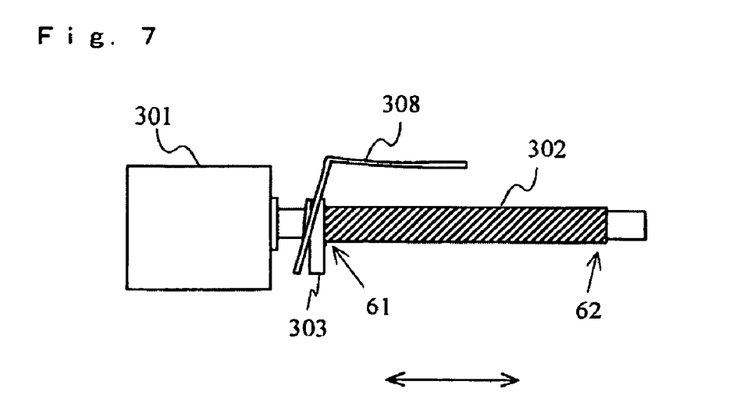
FIG. 7 is a view to explain function of a leaf spring member of a lens drive mechanism according to the embodiment.

Here, FIG. 2 is a schematic perspective view showing a structure of the lens drive mechanism according to the embodiment. FIG. 3A is a schematic perspective view showing a lead nut of the lens drive mechanism according to the embodiment. FIG. 3B is a view showing relation between a lead nut and a lens holder of the lens drive mechanism according to the embodiment. FIG. 4 is a schematic perspective view showing a structure of a leaf spring member of the lens drive mechanism according to the embodiment. FIG. 5 is a schematic plan view showing a structure of a leaf spring member of the lens drive mechanism according to the embodiment. FIG. 6 is a view to explain fixed positions of a stepping motor and a leaf spring member in the lens drive mechanism according to the embodiment. FIG. 7 is a view to explain function of a leaf spring member of the lens drive mechanism according to the embodiment.

Referring to FIGS. 2, 3A and 3B, the lens drive mechanism 30 according to the embodiment comprises a stepping motor 301, a lead screw 302, a lead nut 303, a lens holder 304, two guide shafts 305a and 305b, a pressurizing spring 306, a photo interrupter 307, and a leaf spring member 308.

In the embodiment, the lens drive mechanism 30 is directly mounted on a slide base (not shown, a base on which an optical member and others are mounted) of the optical pickup 1. However, another structure may be employed, in which a base on which only the lens drive mechanism 30 is mounted is disposed, and the base that holds the lens drive mechanism is mounted on the slide base.

The stepping motor 301 is fixed and disposed on the slide base. Because the lens drive mechanism 30 according to the embodiment uses the stepping motor 301 as a drive source, it is possible to control the movement amount (in other words, the lens position) of the lens (the lens holder 304) depending on the number of steps.

The lead screw 302 is formed of, for example, a metal, connected to an output shaft of the stepping motor 301 and rotated by operation of the stepping motor 301. The lead screw 302 is formed with a spiral thread. Both end portions of the lead screw 302 have part where a spiral thread is not formed.

As shown in FIG. 3A, the lead nut 303 includes a first portion 3031 that has a substantially cylindrical shape, and a second portion 3032 that is formed at a lower portion of the first portion 3031 and has a substantially rectangular parallelepiped shape. The first portion 3031 is provided with a through hole 3033 and the inner surface of the through hole 3033 is threaded to engage with a thread formed on the lead screw 302. The lead nut 302 is formed of a resin (e.g., polyacetal (POM)) into a single body in the embodiment.

The second portion 3032 of the lead nut 303 is so disposed as to engage with a guide rail formed on the base, not shown. The guide rail extends in a direction parallel to the longitudinal direction of the lead screw 302. Accordingly, if the lead screw 302 rotates with the lead screw 302 inserted into the through hole 3033, the lead nut 303 moves along the guide rail without rotating. As shown in FIG. 3B, the lead nut 303 is disposed closer to the stepping motor 301 than the lens holder 304 is.

The lens holder 304 is formed of, for example, a resin (polyphenylene sulphide resin (PPS), liquid crystal polymer (LCP) or the like) and holds the collimate lens 14. In detail, the lens holder 304 comprises a main body portion 3041, a hold portion 3042 that includes a through hole formed through the main body potion 3041 and holds the collimate lens 14, a bearing portion 3043 through which a guide shaft 305a is inserted, a bearing portion 3044 through which a guide shaft 305b is inserted, a protrusion portion 3045 that so protrudes as to be detected by the photo interrupter 307 described later, and a cutout portion 3046 that is so formed that the lead screw 302 and the main body portion 3041 do not come into contact with each other.

As shown in FIGS. 2 and 3B, the main body portion 3041 has a shape that extends to a point beyond the lead screw 302 in order to come into contact with the lead nut 303.

The two guide shafts 305a and 305b are formed of, for example, a metal and disposed parallel to each other. The longitudinal directions of the guide shafts 305a and 305b are directions parallel to the optical-axis direction of the collimate lens 14. The two guide shafts 305a and 305b are fixed on the slide base not shown.

The pressurizing spring 306 is formed into a coil shape and mounted loosely on the guide shaft 305a (more exactly, the pressurizing spring 306 is mounted loosely on part of the lens holder 304 as well). The pressurizing spring 306 pressurizes the lens holder 304 toward the stepping motor 301. Accordingly, if the lead screw 302 is rotated by operation of the stepping motor 301 and the lead nut 303 moves in a direction to be away from the stepping motor 301, the lens holder 304 is pushed by the lead nut 303 and moves in a direction to be away from the stepping motor 301. On the other hand, if the lead nut 303 moves in a direction to be close to the stepping motor 301, the lens holder 304 moves in a direction to be close to the stepping motor 301 with the aid of pressurizing force of the pressurizing spring 306.

The photo interrupter 307 is fixed and disposed on the slide base not shown and used to set a base position of the lens holder 304. As described above, the protrusion portion 3045 protrudes from the main body portion 3041 of the lens holder 304. If the protrusion portion 3045 blocks light that travels from a light emitting portion (not shown) of the photo interrupter 307 to a light receiving portion (not shown) of the photo interrupter 307, it is determined by the photo interrupter 307 that the lens holder 304 is situated at the base position. The position of the lens holder 304 is determined by using the number of steps of the stepping motor 301 needed for the movement from the base position to the current position.

The leaf spring member 308 is disposed to cope with an unusual operation in which an electric current keeps flowing through the stepping motor 301 because of trouble with a control circuit that controls operation of the stepping motor 301. Specifically, the leaf spring member 308 is so designed that even if unusual operation occurs, the lead nut 303 is not mechanically locked by the lead screw 320, and further is able to return to usual operation after the unusual operation is resolved.

Referring to FIGS. 4 and 5, the leaf spring member 308 is provided with a first portion 3081 that serves as a top plate, a second portion 3082 that is bent with respect to the first portion 3081 and includes a portion which comes into contact with the lead nut 303, and a fixing portion 3083 that is used to fix the leaf spring member 308 to the slide base not shown. These portions are unitarily formed into a single body.

The first portion 3081 is provided with an opening portion 3081a, and two arm portions 3081b that are formed with the opening portion 3081a interposed therebetween. The second portion 3082 is formed into an inversed M shape, and upper portions of the inversed M shape are linked to the two arm portions 3081b. In the embodiment, the second portion 3082 is so formed that a shaded portion of the second portion 3082 shown in FIG. 4 actually comes into contact with the lead nut 303.

The fixing portion 3083 includes a plate surface that is formed at a position lower than the top plate 3081 and substantially parallel to the top plate 3081. The plate surface substantially parallel to the top plate 3081 is provided with a screw hole 3083a that allows the leaf spring member 308 to be fixed with a screw, and positioning holes 3083b, 3083c that allow the leaf spring member 308 to be positioned with a positioning pin.

In the embodiment, because the leaf spring member 308 is formed as described above, it is advantageous that it is possible to adjust elastic force of the leaf spring member 308 by changing the area of the opening portion 3081a. Besides, because the second portion 3082 is formed into the inversed M shape, it is possible to avoid contact with the lead screw 302 and increase a contact area with the lead nut 303. Accordingly, it is possible to impart elastic force of the leaf spring member 308 to the lead nut 303 in a well-balanced way. Further, as shown in FIG. 4, because there are first and second deformed portions, elastic force comparable to that of special spring steel like, for example, phosphor bronze is obtained with stainless steel (SUS), which is advantageous in terms of cost, handling of components and the like.

As shown in FIG. 6, the fixing portion 3083 of the leaf spring member 308 formed as described above is fixed on the same position as that of a portion where a fixing portion 3011 of the stepping motor is fixed on the slide base 50. Specifically, like the fixing portion 3083 of the leaf spring member 308, the fixing portion 3011 of the stepping motor 301 is provided with a screw hole and two positioning holes. Accordingly, the leaf spring member 308 is positioned on the slide base 50 by two positioning pins 52, 53 formed on the slide base 50 with the fixing portion 3011 of the stepping motor 301 and the fixing portion 3083 of the leaf spring member 308 overlaid (the fixing portion 3083 of the leaf spring member 308 is situated on the fixing portion 3011 of the stepping motor 301) and fixed with a screw 51.

The leaf spring member 308 does not necessarily need to be fixed on the same position as the stepping motor 301. However, in the lens drive mechanism 30 according to the embodiment, the positional relation between the leaf spring member 308 and the stepping motor 301 is important, and the structure according to the embodiment is preferable for the purpose of preventing deviation in the mounting position between the leaf spring member 308 and the stepping motor 301.

Next, function of the leaf spring member 308 is explained with reference to FIG. 7. Here, a case where the lead nut 303 tries to keep advancing toward the stepping motor 301 because of unusual operation is explained.

As shown in FIG. 7, in the embodiment, the leaf spring member 308 is so disposed as to come into contact with the lead nut 303 at a position near one end 61 of the thread portion of the lead screw 302 close to the stepping motor 301. Because the lead nut 303 comes into contact with the leaf spring member 308 to elastically deform the leaf spring member 308, the leaf spring member 308 pressurizes the lead nut 303 with elastic force toward the other end 62 of the thread portion of the lead screw 302.

In the structure according to the embodiment, the lead nut 303 and the leaf spring member 308 come into contact with each other near the one end 61 of the thread portion of the lead screw 302, and the contact between them takes place when the unusual operation occurs. In other words, in usual operation, the lead nut 303 and the leaf spring member 308 do not come into contact with each other.

Even after the lead nut 303 comes into contact with the leaf spring member 308, the lead nut 303 advances toward the stepping motor 301 with the aid of drive force of the stepping motor 301 (an electric current keeps flowing because of the unusual operation) despite the elastic force of the leaf spring member 308 (the elastic force of the leaf spring member 308 is so adjusted as to allow such operation). And, the lead nut 303 comes off the engagement with the lead screw 302. There is a sufficient distance between the one end of the thread portion of the lead screw 302 and the stepping motor 301, so that the lead nut 303 does not hit the stepping motor 301 even if the lead nut 303 comes off the engagement with the lead screw 303.

The lead nut 302 having come off the engagement with the lead screw 302 is pushed by the pressurizing force of the leaf spring member 308 toward the thread of the lead screw 302 and tries to engage with the lead screw 302. However, by the drive force of the stepping motor 301, the lead nut 302 is held in a state in which the lead nut 302 is out of the engagement with the lead screw 302 in the unusual operation.

If the unusual operation is resolved, the lead nut 303 is pushed by the pressurizing force of the leaf spring member 308 to the thread of the lead screw 302. Then, the lead screw 302 is rotated backward by the stepping motor 301, and the lead nut 303 engages with the lead screw 302. Usually, the lead screw 302 has play to slightly move in a thrust direction (indicated by an arrow in FIG. 7). Accordingly, the position and elastic force of the leaf spring member 308 is so adjusted that the lead nut 303 is able to engage with the lead screw 302 despite the play of the lead screw 302.

In detail, it is necessary to adjust the elastic force of the leaf spring member 308 considering a fabrication gap caused by part dimensions and the like As described above, the lens drive mechanism 30 according to the embodiment is so designed that the leaf spring member 308 prevents the lead nut 303 from hitting the stepping motor 301. Accordingly, it is possible to reduce a possibility that mechanical lock occurs between the lead nut 303 and the lead screw 302. Besides, it is also possible to put the lead nut 303 and the lead screw 302 back into the engagement with each other after unusual operation is resolved.

In the embodiment, the leaf spring member 308 prevents mechanical lock only when the lead nut 303 tries to keep advancing toward the stepping motor 301 because of unusual operation. There is also a possibility that the lead nut 303 tries to keep advancing in a direction to be away from the stepping motor 301 because of unusual operation. However, in the lens drive mechanism 30 according to the embodiment, even if the lead nut 303 tries to keep advancing in a direction to be away from the stepping motor 301 in unusual operation, because of the presence of the pressurizing spring 306, it is low in possibility that mechanical lock occurs between the lead nut 303 and the lead screw 302. Accordingly, in the lens drive mechanism 30 according to the embodiment, another leaf spring member for preventing mechanical lock from occurring when the lead nut 303 tries to keep advancing in a direction to be away from the stepping motor 3301 because of unusual operation is not disposed.

The embodiments described above are examples, and the lens drive mechanism and the optical pickup according to the present invention are not limited to the embodiments described above. Various modifications can be made without departing from the objects of the present invention.

Figure 8A:
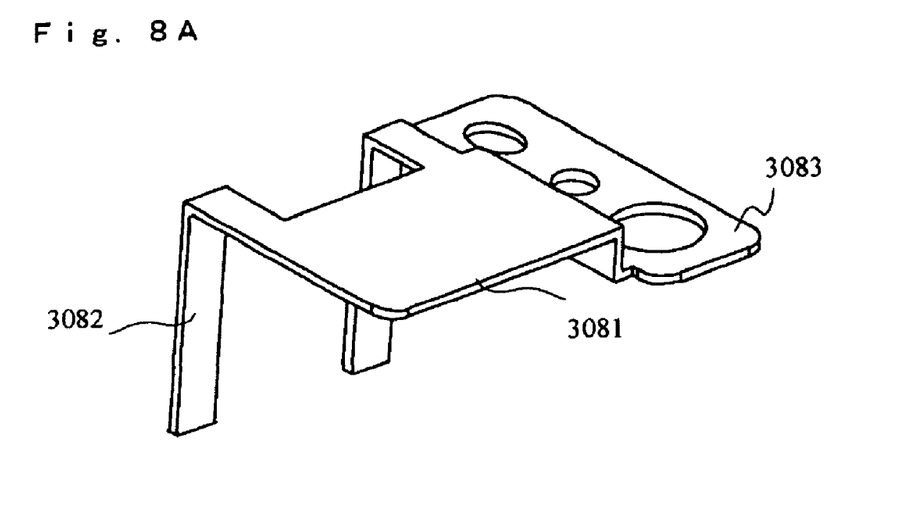
FIG. 8A is view showing a modification of a leaf spring member of a lens drive mechanism according to the embodiment.
Figure 8B:
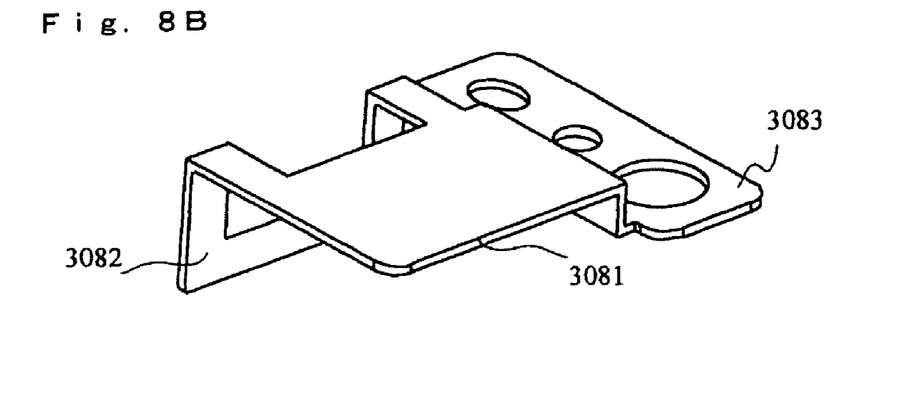
FIG. 8B is view showing a modification of a leaf spring member of a lens drive mechanism according to the embodiment.

For example, the structure of the leaf spring member of the lens drive mechanism is not limited to the structure according to the embodiments. In other words, structures shown in FIGS. 8A and 8B may be employed. FIGS. 8A and 8B are each views showing modifications of the leaf spring member of the lens drive mechanism. Both modifications are made by varying the structure of the second portion 3082 of the leaf spring member 308 according to the embodiment. However, the structure according to the embodiments is preferable than these modifications in that the it is possible to secure a large contact area between the second portion 3082 and the lead nut 303 and easy to obtain a desired elastic force without using special spring steel.

In the embodiments, the structure is employed, in which the lead nut 303 and the lead screw 302 come off the engagement therebetween when the lead nut 303 tries to keep advancing toward the stepping motor 301 because of unusual operation. However, the present invention is not limited to the structure. In other words, a structure may be employed, in which the presence of the leaf spring member 308 (the elastic force of the leaf spring member 308) prevents mechanical lock from occurring between the lead nut 303 and the lead screw 302 with the lead nut 303 and the lead screw 302 engaging with each other.

Besides, in the embodiments, the structure is employed, in which mechanical lock is prevented from occurring when the lead nut 303 comes close to the stepping motor 301. However, a structure is possible, in which the positions of the pressurizing spring 306 and the lead nut 303 are opposite to those in the embodiments with respect to the lens holder 304. In such a case, it is possible that mechanical lock occurs when the lead nut 303 keeps moving in a direction to be away from the stepping motor 301 because of unusual operation. In such a structure, to prevent mechanical lock, it is sufficient to so dispose the leaf spring member 308 as to allow the leaf spring member 308 come into contact with the lead nut 303 at a position near the other end 62 (see FIG. 7) of the thread portion of the lead screw 302 opposite to the stepping motor 301. In this case, if the lead nut 303 comes into contact with the leaf spring member 308, the leaf spring member 308 pressurizes the lead nut 303 toward the one end 61.

In the embodiments, the lens drive mechanism 30 is a lens drive mechanism that moves the collimate lens in the optical-axis direction. However, the present invention is not limited to this structure, and of course is applicable to a lens drive mechanism that moves another lens in the optical-axis direction. For example, the present invention is applicable to a lens drive mechanism that is used to drive an expander lens for correcting spherical aberration. In addition, the lens drive mechanism according to the present invention may be a lens drive mechanism that is incorporated in an optical apparatus other than an optical pickup.

In the embodiments described above, the optical pickup is used for a Blu-ray disc (BD). However, the present invention is widely applicable to optical pickups in which a structure for moving a lens in the optical-axis direction is employed to correct spherical aberration. In other words, it is needless to say that the present invention is applicable to a case where an optical pickup performs reading and writing information from and to an optical disc other than a Blu-ray disc (BD).

The lens drive mechanism according to the present invention is not easily influenced by vibration impact. Besides, the lens drive mechanism according to the present invention is achieved with a simple structure in which mechanical lock does not easily occur even in unusual operation. Accordingly, the present invention is applicable to optical apparatuses such as optical pickups and the like.

What is claimed is:

1. A lens drive mechanism, comprising:
a drive source;
a lead screw that is connected to the drive source and rotated by operation of the drive source;
a nut member that screws on the lead screw and moves as the lead screw rotates;
a lens hold portion that is so disposed as to move as the nut member moves and hold a lens;
a guide member that guides the lens hold portion to move in the same direction as that of movement of the nut member;
a leaf spring member that if the nut member is situated near one end of a thread portion of the lead screw, pressurizes the nut member toward the other end of the thread portion of the lead screw;
an energizing member that energizes the lens hold portion toward the drive source, wherein
the nut member is disposed closer to the drive source than the lens hold portion is, and
the leaf spring member pressurizes the nut member situated near the one end of the thread portion of the lead screw which is close to the drive source, and wherein
the drive source is provided with a first fixing portion that is used to fix the drive source on a base member,
the spring member is provided with a second fixing portion that is used to fix the spring member on the base member, and
the first fixing member and the second fixing member are fixed on the base member at the same position.

2. The lens drive mechanism according to claim 1, wherein the leaf spring member includes a first portion that serves as a top plate, and a second portion that is bent with respect to the first portion and has a portion which comes into contact with the nut member.

3. The lens drive mechanism according to claim 2, wherein the first portion is provided with an opening portion and two arm portions that are formed with the opening portion interposed therebetween, and the two arm portions are linked to the second portion that is formed into an inversed M shape.

4. An optical pickup comprising the lens drive mechanism described in claim 2.

5. The optical pickup according to claim 4, wherein the lens is a collimate lens, the collimate lens is moved in an optical-axis direction by the lens drive mechanism.

6. An optical pickup comprising the lens drive mechanism described in claim 1.

7. The optical pickup according to claim 6, wherein the lens is a collimate lens, the collimate lens is moved in an optical axis direction by the lens drive mechanism.

8. A lens drive mechanism, comprising:
a drive source;
a lead screw that is connected to the drive source and rotated by operation of the drive source;
a nut member that screws on the lead screw and moves as the lead screw rotates;
a lens hold portion that is so disposed as to move as the nut member moves and hold a lens;
a guide member that guides the lens hold portion to move in the same direction as that of movement of the nut member;
a leaf spring member that if the nut member is situated near one end of a thread portion of the lead screw, pressurizes the nut member toward the other end of the thread portion of the lead screw,
wherein
the leaf spring member includes a first portion that serves as a top plate, and a second portion that is bent with respect to the first portion and has a portion which comes into contact with the nut member, wherein
the first portion is provided with an opening portion and two arm portions that are formed with the opening portion interposed therebetween, and the two arm portions are linked to the second portion that is formed into an inversed M shape.

9. An optical pickup comprising the lens drive mechanism described in claim 8.

10. The optical pickup according to claim 9, wherein the lens is a collimate lens, the collimate lens is moved in an optical-axis direction by the lens drive mechanism.

11. A lens drive mechanism, comprising:
   a drive source;
   a lead screw that is connected to the drive source and rotated by operation of the drive source;
   a nut member that screws on the lead screw and moves as the lead screw rotates;
   a lens hold portion that is so disposed as to move as the nut member moves and hold a lens;
   a guide member that guides the lens hold portion to move in the same direction as that of movement of the nut member;
   a leaf spring member that if the nut member is situated near one end of a thread portion of the lead screw, pressurizes the nut member toward the other end of the thread portion of the lead screw; and
   an energizing member that energizes the lens hold portion toward the drive source, wherein
   the nut member is disposed closer to the drive source than the lens hold portion is, and
   the leaf spring member pressurizes the nut member situated near the one end of the thread portion of the lead screw which is close to the drive source;
   wherein the leaf spring member includes a first portion that serves as a top plate, and a second portion that is bent with respect to the first portion and has a portion which comes into contact with the nut member, and
   wherein the first portion is provided with an opening portion and two arm portions that are formed with the opening portion interposed therebetween, and the two arm portions are linked to the second portion that is formed into an inversed M shape.

* * * * *